(12) United States Patent
Cheng (10) Patent No.: US 11,527,218 B2
(45) Date of Patent: Dec. 13, 2022

(54) CURVED DISPLAY SCREEN AND ELECTRONIC DEVICE

(71) Applicant: GUANGDONG OPPO MOBILE TELECOMMUNICATIONS CORP., LTD., Guangdong (CN)

(72) Inventor: Jiao Cheng, Dongguan (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 0 days.

(21) Appl. No.: 17/482,542

(22) Filed: Sep. 23, 2021

(65) Prior Publication Data

US 2022/0013083 A1 Jan. 13, 2022

Related U.S. Application Data (63) Continuation of application No. PCT/CN2020/094825, filed on Jun. 8, 2020.

(30) Foreign Application Priority Data

Jun. 27, 2019 (CN) .......................... 201910565924.9

(51) Int. Cl.
| | |
|---|---|
| G09G 3/30 | (2006.01) |
| G09G 5/10 | (2006.01) |
| G09G 3/00 | (2006.01) |
| G06F 1/16 | (2006.01) |

(52) U.S. Cl.
CPC ............. *G09G 5/10* (2013.01); *G06F 1/1637* (2013.01); *G09G 3/03* (2020.08); *G09G 2300/0439* (2013.01); *G09G 2310/0232* (2013.01); *G09G 2320/0686* (2013.01)

(58) Field of Classification Search
CPC .... G09G 5/10; G09G 3/03; G09G 2300/0439; G09G 2310/0232; G09G 2320/0686; G09G 2340/0407; G09G 3/20; G06F 1/1637; G09F 9/30; G09F 9/301
See application file for complete search history.

(56) References Cited

U.S. PATENT DOCUMENTS

| | | |
|---|---|---|
| 2004/0227703 A1 | 11/2004 | Lamvik et al. |
| 2016/0211472 A1 | 7/2016 | Oh |
| 2016/0240154 A1 | 8/2016 | Forutanpour et al. |

(Continued)

FOREIGN PATENT DOCUMENTS

| | | |
|---|---|---|
| CN | 104157246 A | 11/2014 |
| CN | 104378566 A | 2/2015 |

(Continued)

OTHER PUBLICATIONS

The second Office Action dated Nov. 15, 2021 from China Application No. CN201910565924.9.

(Continued)

*Primary Examiner* — Adam R. Giesy
(74) *Attorney, Agent, or Firm* — Adsero IP (57) ABSTRACT

The present disclosure provides a curved display screen and an electronic apparatus. The curved display screen includes a flat display area; and a curved display area, wherein the curved display area is arranged around the flat display area, and a pixel density in at least one part of the curved display area is lower than a pixel density in the flat display area.

19 Claims, 7 Drawing Sheets

(56) References Cited

U.S. PATENT DOCUMENTS

| | | | | |
|---|---|---|---|---|
| 2018/0113241 A1* | 4/2018 | Powell | .................. | G06F 1/1694 |
| 2019/0163006 A1* | 5/2019 | Lu | ..................... | G02F 1/134336 |
| 2021/0004117 A1* | 1/2021 | Kim | .................... | H04M 1/0266 |

FOREIGN PATENT DOCUMENTS

| | | | | |
|---|---|---|---|---|
| CN | 104575322 A | | 4/2015 | |
| CN | 106023821 A | | 10/2016 | |
| CN | 107293570 A | | 10/2017 | |
| CN | 107908038 A | | 4/2018 | |
| CN | 108648631 A | * | 10/2018 | ............. G09F 9/301 |
| CN | 108648631 A | | 10/2018 | |
| CN | 207947007 U | | 10/2018 | |
| CN | 108766253 A | | 11/2018 | |
| CN | 108766977 A | | 11/2018 | |
| CN | 109256493 A | | 1/2019 | |
| CN | 109637457 A | | 4/2019 | |
| CN | 109637457 A | * | 4/2019 | ........... G09G 3/3233 |
| CN | 109638060 A | | 4/2019 | |
| KR | 20160120848 A | | 10/2016 | |
| KR | 20190046135 A | | 5/2019 | |
| TW | 201629947 A | | 8/2016 | |

OTHER PUBLICATIONS

International Search Report and the Written Opinion dated Aug. 27, 2020 From the International Searching Authority Re. Application No. PCT/CN2020/094825.

The first Office Action dated May 20, 2021 from from China Application No. 201910565924.9.

The partial supplementary European search report dated Apr. 7, 2022 from European patent Application No. 20833008.4.

The Notice Of Allowance dated Mar. 2, 2022 from Chinese Application No. 201910565924.9.

* cited by examiner (a)

CURVED DISPLAY SCREEN AND ELECTRONIC DEVICE

CROSS REFERENCE TO RELATED APPLICATIONS

This application is a continuation of International Application No. PCT/CN2020/094825, filed Jun. 8, 2020, which claims priority of Chinese patent applications No. 201910565924.9 filed Jun. 27, 2019, the contents of which are incorporated herein by reference in their entirety.

BACKGROUND

Field

The present disclosure relates to the field of display technology, and more particular, to a curved display screen and an electronic device.

Background

At present, full three-dimensional (3D) display screens are becoming more and more popular with the public due to their curved appearance and full display effects. During fabrications thereof, four edges and four corners of the 3D display screens are formed with curved arcs, and the display screens on the four sides are just bent in one direction, while the four corners of the display are bent in two different directions at the same time. Therefore, it will be wrinkled and cannot be attached to the glass cover at the four corners of the display when the screen is attached to a cover. Thus, the four corners of the screen are needed to be stretched correspondingly so as to completely fit the cover for preventing wrinkles or fitting failures, which result in undesirable phenomena such as bubble issues.

Therefore, research on the curved display screen needs to be further in-depth.

SUMMARY

The present disclosure aims to solve at least one of the technical problems in the related art. For this reason, an objective of the present disclosure is to provide a curved display screen that has advantages of being easily attached to the curved cover.

An aspect of the present disclosure provides a curved display screen. According to an embodiment of present disclosure, the curved display screen comprises a flat display area; and a curved display area, wherein the curved display area is arranged around the flat display area, and a pixel density in at least one part of the curved display area is lower than a pixel density in the flat display area.

Another aspect of the present disclosure provides a method for driving a curved display screen. According to an embodiment of the present disclosure, the curved display screen comprises a flat display area; and a curved display area, wherein the curved display area is arranged around the flat display area, and a pixel density in at least one part of the curved display area is lower than a pixel density in the flat display area. The driving method comprises making a driving current of pixels in the curved display area greater than a driving current of pixels in the flat display area, so that a brightness of the pixels in the curved display area is greater than a brightness of the pixels in the flat display area.

Yet another aspect of the present disclosure provides an electronic device. According to an embodiment of the present disclosure, the electronic device comprises a curved display of describe above; a housing, wherein the housing is connected to the curved display screen, and an installation space is defined between the curved display screen and the housing; a motherboard, wherein the motherboard is arranged in the installation space, a display drive device is arranged on the motherboard, and the display drive device is electrically connected to the curved display screen; and a curved transparent cover plate arranged on a surface of the curved display screen away from the housing.

BRIEF DESCRIPTION OF THE DRAWINGS

In order to more clearly illustrate the embodiments of the present application or the technical solutions in the related art, the drawings to be used in the descriptions of the embodiments or the related art will be briefly introduced below. Obviously, the drawings described below only illustrate some embodiments of the present application, and other drawings can be obtained according to these drawings without any creative effort for those skilled in the art.

DETAILED DESCRIPTION OF THE ILLUSTRATED EMBODIMENTS

Embodiments of the present disclosure are described in detail below. Embodiments described below are exemplary, and are only used to explain the present disclosure, and should not be construed as limiting the present disclosure. Where specific techniques or conditions are not indicated in the examples, the procedures shall be carried out in accordance with the techniques or conditions described in the literature in the field or in accordance with the product specification.

Figure 2:
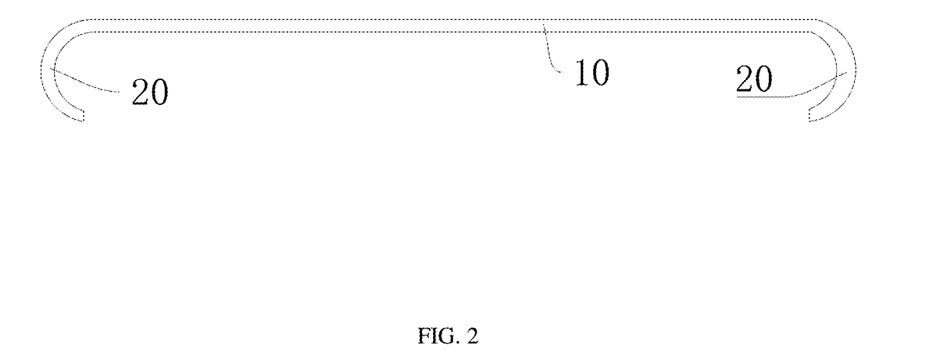
FIG. 2 is a cross-sectional view of the curved display screen in FIG. 1 along AA'.
Figure 3:
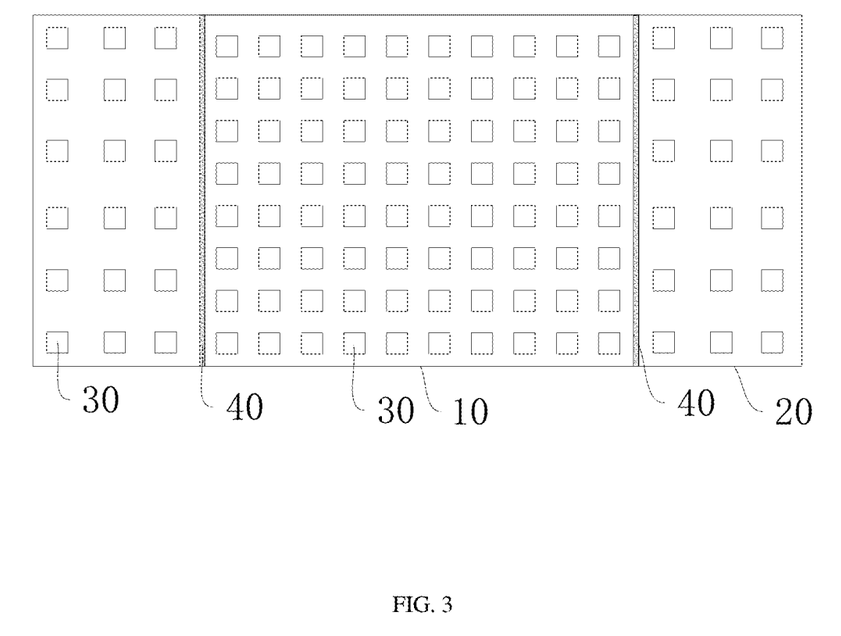
FIG. 3 is a schematic diagram showing a pixel distribution in a curved display screen in another embodiment of the present disclosure.

An aspect of the present disclosure provides a curved display screen. According to an embodiment of present disclosure, referring to FIG. 1, FIG. 2 and FIG. 3, the curved display screen 100 comprises a flat display area 10; and a curved display area 20. The curved display area 20 is arranged around the flat display area 10, and a pixel density (e.g. pixels per inch, PPI) in at least one part of the curved display area 20 is lower than a pixel density in the flat display area 10. A cube 30 in FIG. 3 represents a pixel, and a high distribution density of the cube represent the higher of the pixel density. As a result, since the curved display area 20 can be properly stretched during curving of the curved display area, and the phenomenon that the curved display area is wrinkled or cannot be attached to a curved glass cover due to bending can be avoided, which is more conducive to bending to form the curved part of the curved display screen, and the curved display screen and the curved glass cover can be completely attached, thereby prevent generation of air bubbles.

Since the pixel density of the curved display area 20 is relatively lower, and the principle of relatively increasing the stretchability of the curved display area can be: structures such as the thin film transistor (TFT), the inorganic layer, metal wiring in the pixel are not conducive for stretching and deformation of the flexible display. The flexible substrate in the curved display screen has better flexibility and can be stretched to a certain extent, so when the pixel density is decreased, an area of the non-pixel area will be increased correspondingly, and the non-pixel area will increase accordingly. There are few metal traces and other structures in the non-pixel area, which is mainly a flexible substrate, so the stretchability of the non-pixel area can be improved. Therefore, increases in an area of the non-pixel area will correspondingly improve the stretchability of the curved display area, that is, the lower the pixel density is, it is more beneficial to improve the stretchability of the display area.

Herein, the practical material of the flexible substrate is not limited, and those skilled in the art can choose flexibly according to the usage situation. In the embodiments of the present disclosure, the material of the flexible substrate may be polyimide (PI), which is flexible and can be stretched flexibly, and the flexible substrate made of this material has good performance, and the required inorganic layer, metal layer and other laminated structures can be produced on its surface.

In the following, according to some embodiments of the present disclosure, a specific method for reducing the PPI in the curved surface display area is described in detail.

Referring to FIG. 3, the pixel density of the curved display area 20 is lower than the pixel density of the flat display area, and the pixel density of the curved display area 20 is uniform. Thus, effects of increasing the stretchability of the curved display area can be achieved, so that the curved display area of the curved display screen can be better bent to form a perfect fit with the curved glass cover.

However, the inventor further discovered that if the pixel density is directly reduced from a larger value in the flat display area 10 to a lower value in the curved display area 20 in FIG. 3, that is, decreases in the pixel density in the curved display area is relatively lower than that in the flat display area, there will be an obvious boundary line 40 at the boundary between the flat display area 10 and the curved display area 20 when the curved display screen displays the picture. The brightness of the curved surface display area is obviously lower than the brightness of the flat display area inside the boundary line, which seriously affects the viewing performances.

Figure 4:
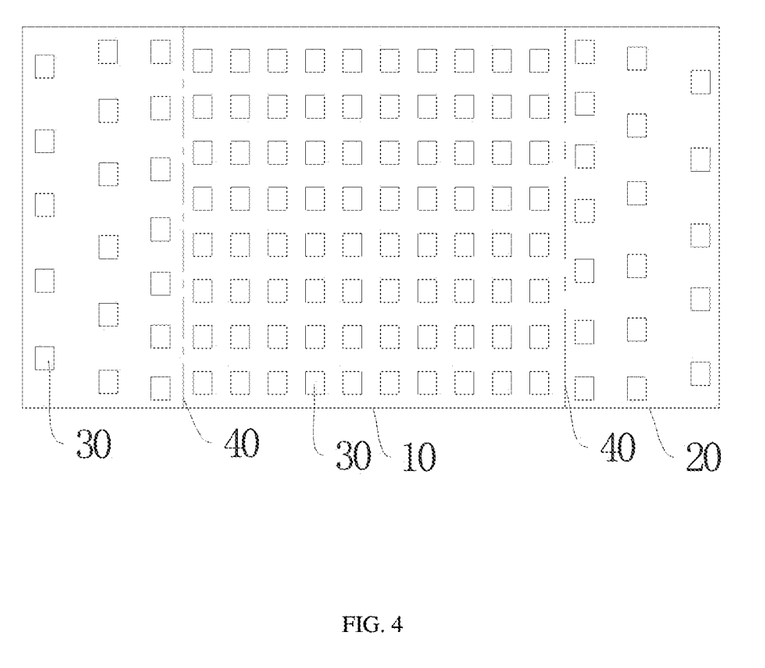
FIG. 4 is a schematic diagram of a pixel distribution in a curved display screen in yet another embodiment of the present disclosure.

Referring to FIG. 4, the pixel density in the curved display area 20 is gradually decreased in the direction away from the flat display area 10. For example, the pixel density in the flat display area is 400, the minimum value of the pixel density in the curved display area is 200, and the pixel density in the curved display area 20 can be gradually decreased from 400 to 200, that is, the pixel density in the curved display area is first decreased from 400 to 350, then decreased to 300, then decreased to 250, and finally reduced to 200. Therefore, while ensuring that the curved display area is easy to be bent and stretched, the boundary line in FIG. 3 (the broken line in FIG. 4 represents the weakened boundary line 40) is effectively weaken or even eliminated, and the brightness the curved display area close to the edge of the flat display area is similar to the brightness of the flat display area, and then is gradually and slowly decreased, which greatly reduces the difference in brightness visually, thereby improving the display quality of the curved display screen.

Figure 5:
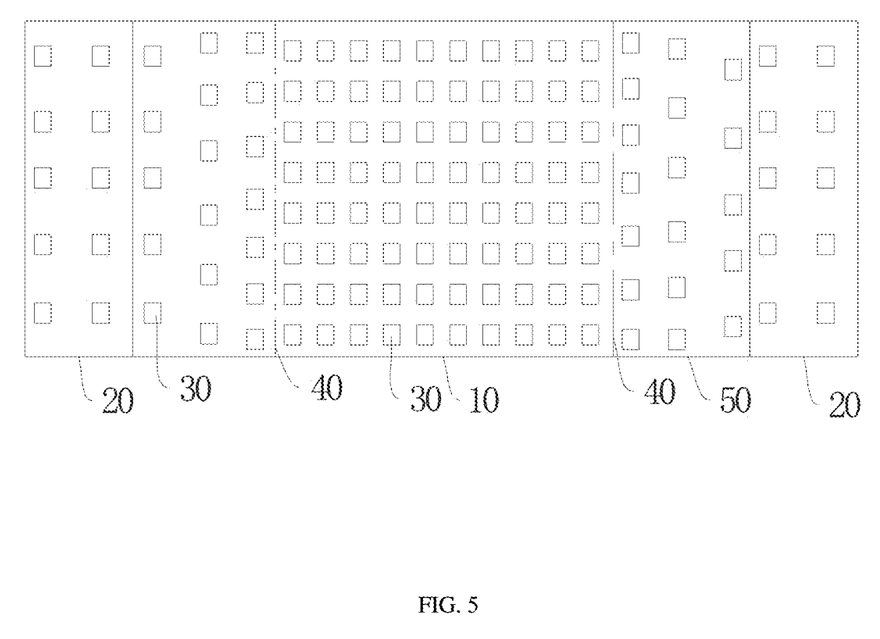
FIG. 5 is a schematic diagram of a pixel distribution in a curved display screen in yet another embodiment of the present disclosure.

Referring to FIG. 5, the curved display screen further comprises a transition display area 50. The transition display area 50 is arranged between the flat display area 10 and the curved display area 20, and the pixel density of the transition display area 50 is gradually decreased in the direction away from the flat display area 10. The maximum value of the pixel density in the transition display area 50 is lower than or equal to the pixel density in the flat display area 10, and the minimum value of the pixel density in the transition display area 50 is higher than or equal to the pixel density in the curved display area 20. As a result, formation of the transition display area can make the pixel density of the flat display area gradually decrease to the pixel density of the curved display area, for which not only the stretching performance and flexibility of the curved display area is not affected, but also the boundary line in the image in FIG. 3 (dashed lines in FIG. 5 represents a weakened boundary line 40) can be effectively weaken or even eliminated, and the brightness of the curved display area near the edge of the flat display area is similar to the brightness of the flat display area, and the brightness is then gradually and slowly decreased, which greatly reduces the visual difference in brightness and improves the display quality of the curved display.

There is no restriction on specific trends of the gradual decreases in the descriptions "the pixel density in the curved display area 20 is gradually decreased" and "the pixel density in the transition display area 50 is gradually decreased" mentioned above, and it can be linear decreased, constant gradient decreased or curve decreased. In some embodiments, the pixel density is gradually and linearly decreased, thereby not only ensuring that the curved display area has good stretch performance, but also can better weaken the boundary line, and visually reduce the brightness difference between the flat display area and the curved surface. The display quality of the display areas of the curved display screen is further improved.

Furthermore, the minimum value of the pixel density in the curved display area is 100 PPI to 200 PPI, such as 100 PPI, 110 PPI, 120 PPI, 130 PPI, 140 PPI, 150 PPI, 160 PPI, 170 PPI, 180 PPI, 190 PPI or 200 PPI. As a result, it is possible to ensure a better stretch performance of the curved display area without affecting the overall display functions and display effects of the curved display area.

Figure 1:
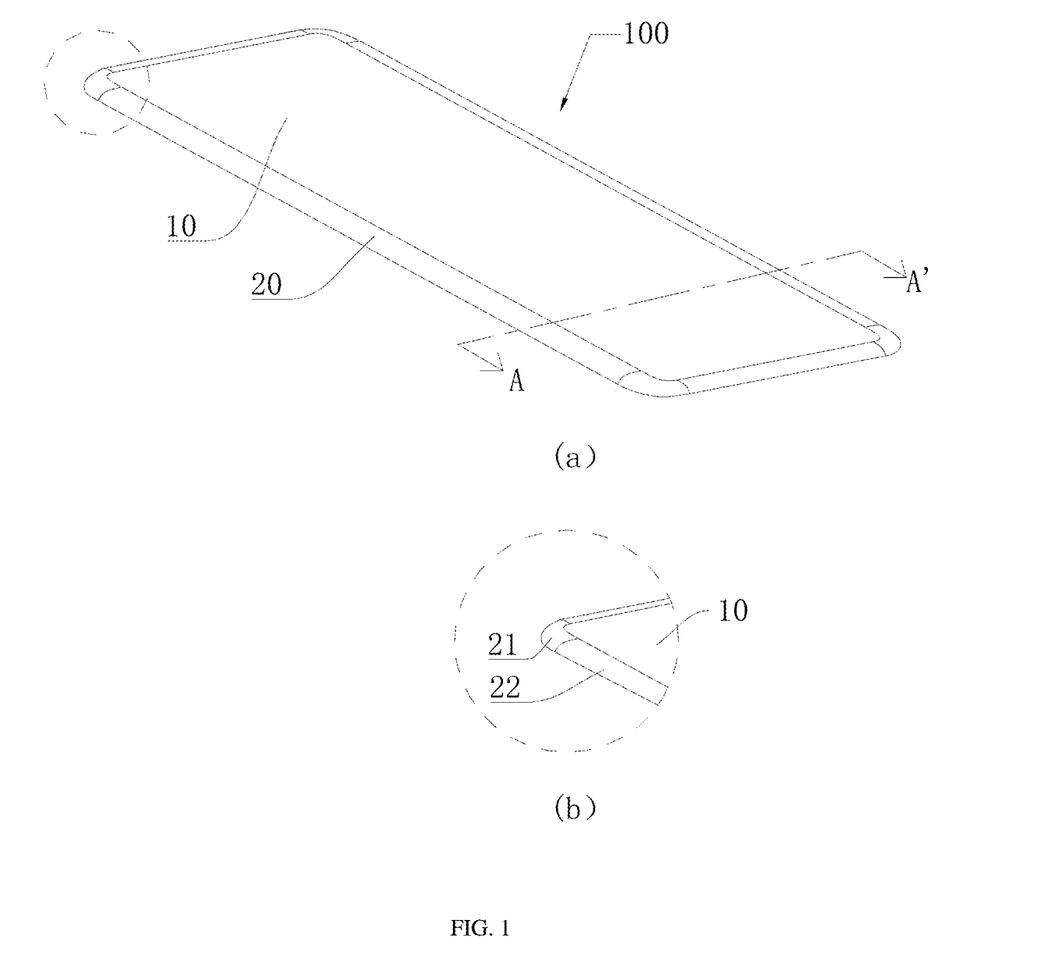
FIG. 1 is a schematic structural diagram of a curved display screen in an embodiment of the present disclosure.

Furthermore, as shown in FIG. 1(*b*) (FIG. 1(*b*) is an enlarged view of a dashed circle frame in FIG. 1(*a*)), the curved display area 20 comprises a straight edge area 22 and a corner area 21 connected to each other. The pixel density in at least a part of the corner area is lower than the pixel density in the flat display area. Since the display area of the corner area needs to be bent in two directions when it is bent, and the display area of the straight edge area needs to be bent in only one direction when it is bent, the corner area needs to have greater stretch performances. Therefore, if the display area of the straight edge area is curved and also meets the requirements for stretching performance when it is bent while maintaining the same pixel density as the flat display area, so the pixel density in the straight edge area may not be reduced (that is, only the pixel density in the corner area is reduced). In this way, it can be ensured that there is no boundary line between the display area of the straight edge area and the flat display area, and the brightness is uniform, which greatly improves the display quality of the display screen.

Figure 6:
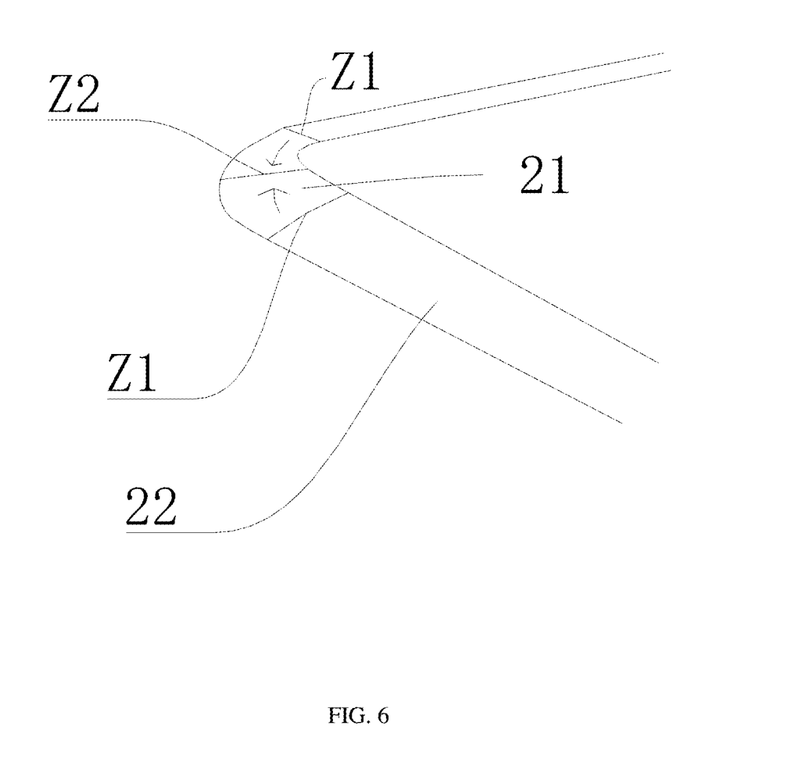
FIG. 6 is a schematic structural diagram of a corner area of a curved display screen in yet another embodiment of the present disclosure.
Figure 7:
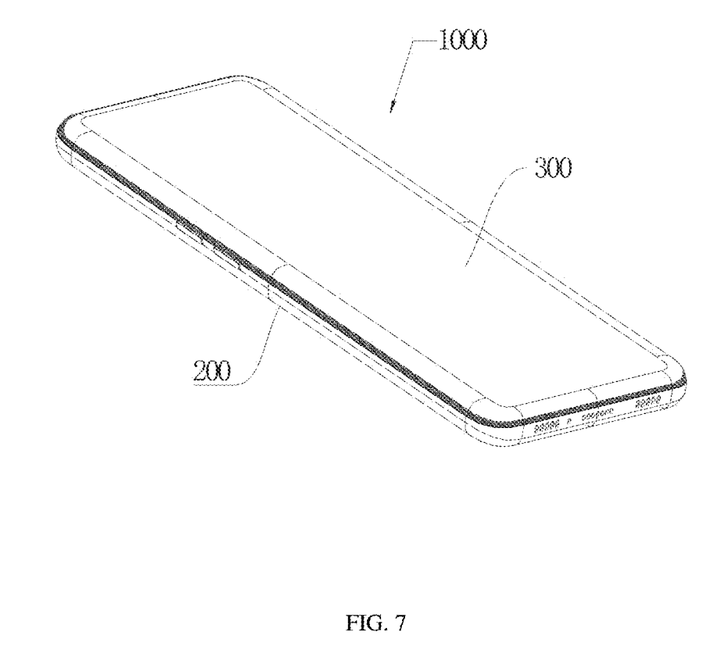
FIG. 7 is a schematic structural diagram of an electronic device in yet another embodiment of the present disclosure.

Furthermore, referring to FIG. 6, the pixel density (pixels are not shown in the figure) in the corner area 21 is gradually decreased in the direction from the connecting line Z1 between the straight edge area 22 and the corner area 21 to the center line Z2 of the corner area 21 (the line evenly divides the corner area). Since the corner area is closer to the center line, the display screen is more curved, and wrinkles are more likely to occur. Therefore, the pixel density in the corner area 21 is gradually reduced in the direction from the connecting line Z1 to the center line Z2, thereby ensuring the middle part of the corner area is easy to be stretched, which is further conducive to the adhesion of the curved display screen and the curved cover.

In another aspect of the present disclosure, the present disclosure provides a method for driving the curved display screen. According to an embodiment of the present disclosure, referring to FIG. 1, FIG. 2 and FIG. 3, the curved display screen 100 comprises: a flat display area 10; and a curved display area 20, wherein the curved display area 20 is arranged around the flat display area 10, and a pixel density in at least one part of the curved display area is lower than a pixel density in the flat display area. The driving method comprises making a driving current of pixels in the curved display area greater than a driving current of pixels in the flat display area, so that a brightness of the pixels in the curved display area is greater than a brightness of the pixels in the flat display area. As a result, not only the problem of the boundary line between the flat display area and the curved display area be weakened, but also a brightness difference between the flat display area and the curved display area can be effectively reduced, thereby effectively improving the overall display effect of the curved display screen.

In a typical curved display screen, the brightness of each pixel in the flat display area and the curved display area is the same. However, in the present disclosure, since the pixel density in at least a part of the curved display area is lower than the pixel density in the flat display area, so the overall luminous brightness of the curved display area will be lower than that of the flat display area. As mentioned above, referring to FIG. 3, if the pixel density in the curved display area 20 remains uniform, or reduction of the pixel density in the curved display area 20 is higher when compared with the pixel density in the flat display area, there will be a clear boundary line 40 between the flat display area 10 and the curved display area 20 when the curved display screen displays a picture. Based on the above problems, the present disclosure increases the driving current of the pixels in the curved display area to increase the brightness of the pixels in the curved display area, so that the brightness of the curved display area is substantially consistent with that of the flat display area (due to environmental factors, human factors and other unavoidable factors, the brightness between the two is difficult to be completely consistent, so here is described as "substantially consistent"). Therefore, not only the difference in brightness between the flat display area and the curved display area can be weakened, but also the boundary line between the flat display area and the curved display area can be weakened, thereby effectively improving the overall display effect of the curved display.

In some embodiments, referring to FIG. 4, in the direction away from the flat display area 10, the pixel density in the curved display area 20 gradually decreases. The driving method of the curved display screen comprises in the direction away from the flat display area 10. Above, the driving current of the pixels 30 in the curved display area 20 is gradually increased, so that the brightness of the pixels 30 in the curved display area 20 gradually increases in a direction away from the flat display area 10. Since the pixel density in the curved display area gradually decreases, the boundary line 40 between the flat display area and the curved display area can be effectively weakened. However, as the pixel density gradually decreases, the brightness in the curved display area gradually decreases. Gradually increasing the driving current of the pixels in the curved display area can gradually increase the brightness of the pixels in the curved display area, so that the brightness of the entire curved display area remains substantially the same, and the brightness difference between the flat display area and the curved display area is reduced. Moreover, the boundary line 40 between the flat display area and the curved display area can be further weakened.

In other embodiments, referring to FIG. 5, the curved display screen further comprises a transition display area 50. The transition display area 50 is disposed between the flat display area 10 and the curved display area 20. The pixel density in the transition display area 50 is gradually decreased in a direction away from the flat display area 10, and the maximum value of the pixel density of the transition display area 50 is less than or equal to that of the pixel density in the flat display area 10, and the minimum value of the pixel density of the transition display area 50 is greater than or equal to that of the pixel density in the curved display area 20. The method of driving the curved display screen further comprises making the driving current of the pixels 30 in the transition display area 50 and the curved display area 20 gradually increases in the direction away from the flat display area 10, so as to make the brightness of the pixels in the area 50 and the curved display area 20 gradually increase in the direction away from the flat display area. Since the setting of the transition display area can make the pixel density of the flat display area gradually decrease to the pixel density of the curved display area, not only the stretching performance and flexibility of the curved display area is not affected, but also the boundary line in FIG. 3 (the weakened boundary line 40 is represented by the dashed line in FIG. 5) is effectively weakened or even eliminated, and the brightness of the curved display area near the edge of the flat display area is similar to that of the flat display area, and then gradually decreases slowly, which greatly reduces the difference in visual brightness. Furthermore, the display quality of the curved display is improved. However, as the pixel density in the transition display area and the curved display area are gradually decreased, the brightness in the transition display area and the curved display area will be gradually decreased. By gradually increasing the driving current of the pixels in the transition display area and the curved display area, the brightness of the pixels in the transition display area and the curved display area can be gradually increased, thereby making brightness of the entire transition display area, the curved display area and the flat display area are substantially the same, and the brightness difference between the flat display area, the transition display area and the curved display area is reduced, and the boundary line 40 can be further weakened.

It should be noted that the above "making the driving current of the pixels 30 in the transition display area 50 and the curved display area 20 gradually increase" means that the driving current of the pixels 30 in the transition display area 50 is gradually increased, and the driving current of the pixels in the curved display area 20 is unchanged. The maximum value of the driving current of the pixel 30 in the transition display area 50 is less than or equal to the driving current of the pixel in the curved display area 20.

In addition, referring to FIG. 1 and FIG. 6, the curved display area 20 comprises a straight edge area 22 and a corner area 21 connected to each other. The pixel density in the corner area 21 is lower than that in the flat display area 10. The driving method comprises making the driving current of the pixels in the area 21 greater than the driving current of the pixels in the flat display area 10 so that the brightness of the pixels in the corner area 21 is greater than the brightness of the pixels in the flat display area 10. Since the pixel density in the corner area 21 is gradually reduced, the boundary line 40 between the flat display area and the corner area 21 can be effectively weakened. However, as the pixel density is gradually reduced, the brightness in the corner area 21 is gradually reduced. Gradually increasing the driving current of the pixels in the corner area 21 can gradually increase the brightness of the pixels in the corner area 21, thereby keeping the brightness of the entire curved display area substantially the same, reducing the brightness difference between the flat display area and the corner area 21. Moreover, the boundary line 40 between the flat display area and the curved corner area 21 can be further weakened. Herein, since the corner area of the display area is needed to be bent in two directions when it is bent, and the straight side area of the display area is needed only one-way bending when it is bent, the corner area needs to have greater tensile performance Therefore, if the straight edge area maintains the same pixel density as the flat display area, the display area can also meet the requirements for stretching performance when it is bent, so the pixel density in the straight edge area may not be reduced (that is, only the pixel density in the corner area may be reduced), this can ensure that there is no boundary line between the straight edge area of display area and the flat display area, and the brightness is uniform, which greatly improves the display quality of the display.

Further, referring to FIG. 6, the pixel density in the corner area 21 is gradually decreased (pixels are not shown in the figure) in the direction from the connecting line Z1 between the straight edge area 22 and the corner area 21 to the center line Z2 (the line evenly dividing the corner area) of the corner area 21. The driving method further comprises gradually increasing the driving current of the pixels in the corner area 21 in the direction from the connecting line Z1 to the center line Z2, so that the brightness of the pixels in the corner area 21 is gradually increased in the direction from the connecting line to the midline. Therefore, the brightness of the pixels in the corner area can be changed according to the distribution of the pixel density in the corner area while ensuring that the curved screen and the curved cover plate are fit without wrinkles, so that the brightness of the entire curved display screen remains substantially the same. In addition, the driving method of the curved display screen can be used to drive the curved display screen described above, wherein the requirements for the pixel density and flexible substrate in the curved display screen are consistent with the requirements of the curved display screen described above, and it will not be omitted here.

Furthermore, the method for driving the display screen further comprises inputting a first display signal to the flat display area 10 so that the flat display area 10 displays a first image; inputting a second display signal to the curved display area 20, so that the curved display area 20 display a second image, wherein the second image is connected to the first image in a gradual transition. Therefore, the weakening of the boundary line 40 is achieved through the gradual transitional connection of the first image and the second image, thereby improving the quality of the display screen of the curved display screen. Herein, those skilled in the art can understand that the first image and the second image jointly constitute the display image of the curved display screen.

Herein, the gradually and transitionally connection comprises at least one of image style gradient, color brightness gradient, contrast gradient, color saturation gradient, degree gradient, and sharpness gradient. Therefore, the technical effect of weakening the boundary line 40 can be effectively achieved through the above method. Specifically, the image style gradient can be the gradient of the pattern of the display image, so that the display image of the gradient transition connection area undergoes a certain change (such as the line density of the pattern is gradually increased, and the color is gradually deepened, etc.). The boundary line is blocked, and then the existence of the boundary line can be weakened visually. The contrast gradient can be reduction of the contrast of the display image in the gradually and transitionally connection area, and the lower contrast picture can effectively block the boundary line, thereby effectively and visually weakening the existence of the boundary line and improving the quality of the display picture. The color brightness gradient can be the gradual reduction of the color brightness of the display image in the gradually and transitionally connection area. That is, the color brightness of the display picture gradually becomes darker, and the brightness is lower. The image can effectively block the boundary line, which can further visually weaken the existence of the boundary line. The color saturation gradient can be the gradual decrease of the saturation of the display picture in the gradually and transitionally connection area. The lower the saturation, the darker the color is usually. A low-saturation picture can effectively block the boundary line, thereby effectively weakening the existence of the boundary line visually. The sharpness gradient refers to the gradual reduction of the sharpness of the display image in the gradually and transitionally connection area since the display image with low sharpness can effectively weaken the existence of the boundary line visually.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of these features. In the description of the present disclosure, "a plurality of" means two or more than two, unless specifically defined otherwise.

Furthermore, the above-mentioned method for driving the curved display screen can be used to drive the curved display screen described above. The requirements for the minimum value of the pixel density in the flexible substrate and the curved display area are the same as those described above and are not described again.

In yet another aspect of the present disclosure, the present disclosure provides an electronic device. According to an embodiment of the present disclosure, referring to FIG. 6, the electronic device 1000 comprises the aforementioned curved display screen (not shown in FIG. 6); a housing 200, wherein the housing is connected to the curved display screen, and an installation space is defined between the curved display screen and the housing 200; a motherboard (not shown in FIG. 6), wherein the motherboard is arranged in the installation space, a display drive device is arranged on the motherboard, and the display drive device is electrically connected to the curved display screen; and a curved transparent cover plate 300 (e.g. glass cover plate) arranged on a surface of the curved display screen away from the housing 200.

Herein, the display driving device is configured to control the driving current of the pixel, so that the driving current of the pixel in the area with low pixel density is greater than the driving current of the pixel in the area with high pixel density. Thus, by controlling the driving current of the pixels to control the brightness of the pixels in the areas of different pixel density, the brightness of the pixels in the areas with low pixel density is improved, so as to ensure that the brightness of the entire display screen is substantially the same.

In some embodiments, the display driving device can be configured to control the driving current of the pixels in the curved display area to be greater than the driving current of the pixels in the flat display area. Therefore, by increasing the driving current of the pixels in the curved display area to increase the brightness of the pixels, not only the boundary line between the flat display area and the curved display area can be weakened, but also the difference between the flat display area and the curved display area can be effectively reduced. The brightness difference between the two, thereby effectively improving the overall display effect of the curved display screen.

Furthermore, referring to FIG. 5, the curved display screen further comprises a transition display area 50. The transition display area 50 is disposed between the flat display area 10 and the curved display area 20. The pixel density in the transition display area 50 is gradually decreased in a direction away from the flat display area 10, and the maximum value of the pixel density of the transition display area 50 is less than or equal to that of the pixel density in the flat display area 10, and the minimum value of the pixel density of the transition display area 50 is greater than or equal to that of the pixel density in the curved display area 20. The display drive device is configured to control the driving current of the pixels 30 in the transition display area 50 and the curved display area 20 being gradually increased in the direction away from the flat display area 10, so as to make the brightness of the pixels in the area 50 and the curved display area 20 gradually increase in the direction away from the flat display area. Therefore, brightness of the entire transition display area, the curved display area and the flat display area can be substantially the same, and the brightness difference between the flat display area, the transition display area and the curved display area is reduced, and the boundary line 40 can be further weakened.

In addition, referring to FIG. 1 and FIG. 6, the curved display area 20 comprises a straight edge area 22 and a corner area 21 connected to each other. The pixel density in the corner area 21 is lower than that in the flat display area 10. The driving method comprises making the driving current of the pixels in the area 21 greater than the driving current of the pixels in the flat display area 10 so that the brightness of the pixels in the corner area 21 is greater than the brightness of the pixels in the flat display area 10. Since the pixel density in the corner area 21 is gradually reduced, the boundary line 40 between the flat display area and the corner area 21 can be effectively weakened.

Furthermore, referring to FIG. 6, the pixel density in the corner area 21 is gradually decreased (pixels are not shown in the figure) in the direction from the connecting line Z1 between the straight edge area 22 and the corner area 21 to the center line Z2 (the line evenly dividing the corner area) of the corner area 21. The driving method further comprises gradually increasing the driving current of the pixels in the corner area 21 in the direction from the connecting line Z1 to the center line Z2, so that the brightness of the pixels in the corner area 21 is gradually increased in the direction from the connecting line to the midline. Therefore, the brightness of the pixels in the corner area can be changed according to the distribution of the pixel density in the corner area while ensuring that the curved screen and the curved cover plate are fit without wrinkles, so that the brightness of the entire curved display screen remains substantially the same.

Furthermore, the display driving device can be configured to control the input of the first display signal to the flat display area so that the flat display area displays the first image; and the display driving device can be configured to control the input to the curved display area The second display signal causes the curved display area to display a second image, wherein the second image is gradually connected to the first image. Therefore, the weakening of the boundary line 40 is achieved through the gradual transitional connection of the first image and the second image, thereby improving the quality of the display screen of the curved display screen. Herein, those skilled in the art can understand that the first image and the second image jointly constitute the display screen of the curved display screen.

Herein, the gradually and transitionally connection comprises at least one of image style gradient, color brightness gradient, contrast gradient, color saturation gradient, degree gradient, and sharpness gradient. Therefore, the technical effect of weakening the boundary line 40 can be effectively achieved through the above method. Specifically, the image style gradient can be the gradient of the pattern of the display image, so that the display image of the gradient transition connection area undergoes a certain change (such as the line density of the pattern is gradually increased, and the color is gradually deepened, etc.). The boundary line is blocked, and then the existence of the boundary line can be weakened visually. The contrast gradient can be reduction of the contrast of the display image in the gradually and transitionally connection area, and the lower contrast picture can effectively block the boundary line, thereby effectively and visually weakening the existence of the boundary line and improving the quality of the display picture. The color brightness gradient can be the gradual reduction of the color brightness of the display image in the gradually and transitionally connection area. That is, the color brightness of the display picture gradually becomes darker, and the brightness is lower. The image can effectively block the boundary line, which can further visually weaken the existence of the boundary line. The color saturation gradient can be the gradual decrease of the saturation of the display picture in the gradually and transitionally connection area. The lower the saturation, the darker the color is usually. A low-saturation picture can effectively block the boundary line, thereby effectively weakening the existence of the boundary line visually. The sharpness gradient refers to the gradual reduction of the sharpness of the display image in the gradually and transitionally connection area since the display image with low sharpness can effectively weaken the existence of the boundary line visually.

There are no special requirements on the specific types of the above electronic devices, and those skilled in the art can flexibly choose according to actual needs. In some embodiments of the present disclosure, the electronic devices may be electronic devices such as mobile phones, tablet computers, game consoles, or kindles.

Those skilled in the art can understand that, in addition to the above-mentioned curved display screen, housing, motherboard, and curved glass cover, electronic equipment also includes structures or components necessary for conventional electronic equipment. Taking a mobile phone as an example, in addition to the above-mentioned structure, it also comprises necessary structures or components such as audio module, fingerprint module, camera module and so on.

In the description of this specification, descriptions with reference to the terms "one embodiment", "some embodiments", "examples", "specific examples", or "some examples" etc. mean specific features described in conjunction with the embodiment or example, structures, materials, or characteristics are included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine and combine the different embodiments or examples and the features of the different embodiments or examples described in this specification without contradicting each other.

Although the embodiments of the present disclosure have been shown and described above, it can be understood that the above-mentioned embodiments are exemplary and should not be construed as limiting the present disclosure. Those of ordinary skill in the art can comment changes, modifications, substitutions, and modifications on the foregoing within the scope of the present disclosure.

What is claimed is:

1. A curved display screen, comprising:
   a flat display area;
   a transition display area; and
   a curved display area, wherein the curved display area is arranged around the flat display area, the transition display area is arranged between the flat display area and the curved display area, and a pixel density in at least one part of the curved display area is lower than a pixel density in the flat display area; and
   wherein a pixel density in the transition display area is gradually decreased in a direction away from the flat display area, a maximum value of the pixel density in the transition display area is less than or equal to the pixel density in the flat display area, a minimum value of the pixel density in the transition display area is greater than or equal to the pixel density in the curved display area.

2. The curved display screen of claim 1, wherein the pixel density in the curved display area is gradually decreased in the direction away from the flat display area.

3. The curved display screen of claim 2, wherein the pixel density in the curved display area is gradually decreased in a linear manner.

4. The curved display screen of claim 1, wherein the curved display area comprises a straight edge area and a corner area connected to each other, and a pixel density in the corner area is lower than a pixel density of the flat display area.

5. The curved display screen of claim 4, wherein the pixel density in the corner area is gradually decreased in a direction from a connecting line of the straight edge area and the corner area to a center line of the corner area.

6. The curved display screen of claim 1, wherein:
   a driving current of pixels in the curved display area is greater than a driving current of pixels in the flat display area, and a brightness of the pixels in the curved display area is greater than a brightness of the pixels in the flat display area.

7. The curved display screen of claim 6, wherein:
   the driving current of the pixels in the curved display area is gradually increased in a direction away from the flat display area, and the brightness of the pixels in the curved display area is gradually increased in the direction away from the flat display area.

8. The curved display screen of claim 1, wherein:
   the curved display screen further comprises a transition display area, and the transition display area is arranged between the flat display area and the curved display area;
   a pixel density in the transition display area is gradually decreased in a direction away from the flat display area, a maximum value of the pixel density in the transition display area is less than or equal to a minimum value of the pixel density in the pixel density in the flat display area, and a minimum value of the pixel density in transition display area is greater than or equal to the pixel density in the curved display area; and
   the driving current of the pixels in the transition display area and the curved display area is gradually increased in a direction away from the flat display area, and the brightness of the pixels in the transition display area and the curved display area are gradually increased in the direction away from the flat display area.

9. The curved display screen of claim 4, wherein:
   a driving current of the pixels in the corner area is greater than the driving current of the pixels in the flat display area, and a brightness of the pixels in the corner area is greater than the brightness of the pixels in the flat display area.

10. The curved display screen of claim 4, wherein:
    the driving current of the pixels in the corner area is gradually increased in the direction from the connecting line to a center line, and the brightness of the pixels in the corner area is gradually increased in the direction from the connecting line to the midline.

11. The curved display screen of claim 1, further comprising:
    a first display signal is input to the flat display area to display a first image in the flat display area; and
    a second display signal is input to the curved display area to display a second image in the curved display area, wherein the second image is gradually and transitionally connected with the first image.

12. An electronic device, comprising:
    a curved display screen, comprising:
      a flat display area;
      a transition display area; and
      a curved display area, wherein the curved display area is arranged around the flat display area, the transition display area is arranged between the flat display area and the curved display area, and a pixel density in at least one part of the curved display area is lower than a pixel density in the flat display area; and
      wherein a pixel density in the transition display area is gradually decreased in a direction away from the flat display area, a maximum value of the pixel density in the transition display area is less than or equal to the pixel density in the flat display area, a minimum value of the pixel density in the transition display area is greater than or equal to the pixel density in the curved display area, a housing, wherein the housing is connected to the curved display screen, and an installation space is defined between the curved display screen and the housing;

a motherboard, wherein the motherboard is arranged in the installation space, a display drive device is arranged on the motherboard, and the display drive device is electrically connected to the curved display screen; and a curved transparent cover plate arranged on a surface of the curved display screen away from the housing.

13. The electronic device of claim 12, wherein the display drive device is configured to control a driving current of the pixels so that the driving current of the pixels in the area with a low pixel density is greater than the driving current of the pixels in the area with a high pixel density.

14. The electronic device of claim 13, wherein the display drive is configured to control the driving current of the pixels in the curved display area to be greater than the driving current of the pixels in the flat display area.

15. The electronic device of claim 14, wherein the display drive device is configured to control the driving current of the pixels in the curved display area to be gradually increased in a direction away from the flat display area.

16. The electronic device of claim 14, wherein, the display drive device is configured to control the driving current of the pixels in the transition display area and the curved display area to be gradually increased in a direction away from the flat display area.

17. The electronic device of claim 14, wherein the display drive device is configured to control the driving current of the pixels in the corner area to be greater than the driving current of the pixels in the flat display area.

18. The electronic device of claim 17, wherein the display drive device is configured to control the driving current of the corner area to be gradually increased in the direction from the connecting line of the straight edge area and the corner area to the center line of the corner area.

19. The electronic device of claim 13, wherein:
the display drive device is configured to control to input a first display signal to the flat display area so that the flat display area displays the first image; and
the display drive device is configured to control to input a second display signal to the curved display area so that the curved display area displays a second image, wherein the second image is gradually and transitionally connected to the first image.

* * * * *